No. 848,385. PATENTED MAR. 26, 1907.
W. E. MOUNCE & S. L. SOUTHERN.
COTTON CHOPPER.
APPLICATION FILED NOV. 19, 1904.

2 SHEETS—SHEET 1.

Witnesses
Inventors
W. E. Mounce
S. L. Southern
By
Chandler & Chandler Attorneys No. 848,385. PATENTED MAR. 26, 1907.
W. E. MOUNCE & S. L. SOUTHERN.
COTTON CHOPPER.
APPLICATION FILED NOV. 19, 1904.

2 SHEETS—SHEET 2.

Witnesses
Inventors
W. E. Mounce
S. L. Southern
By
Chandler & Chandler Attorneys

UNITED STATES PATENT OFFICE.

WILAU E. MOUNCE AND SAMUEL L. SOUTHERN, OF ALBERTA, LOUISIANA.

COTTON-CHOPPER.

No. 848,385.   Specification of Letters Patent.   Patented March 26, 1907.

Application filed November 19, 1904. Serial No. 233,533.

*To all whom it may concern:*

Be it known that we, WILAU E. MOUNCE and SAMUEL L. SOUTHERN, citizens of the United States, residing at Alberta, in the parish of Bienville, State of Louisiana, have invented certain new and useful Improvements in Cotton-Choppers; and we do hereby declare the following to be a full, clear, and exact description of the invention, such as will enable others skilled in the art to which it appertains to make and use the same.

This invention relates to cotton-choppers; and it has for its object to provide a cheap and simple construction which will operate to till the soil and to chop out the cotton at intervals to leave stands of cotton at proper intervals, other objects and advantages of the invention being understood from the following description.

Figure 1:
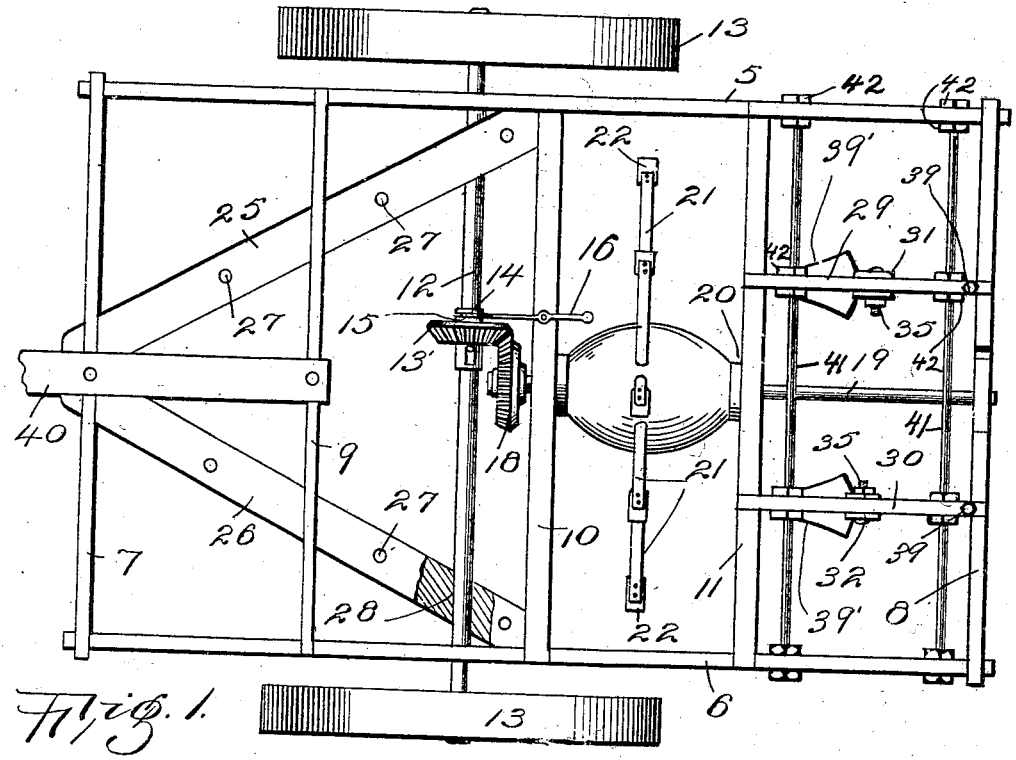
Figure 2:
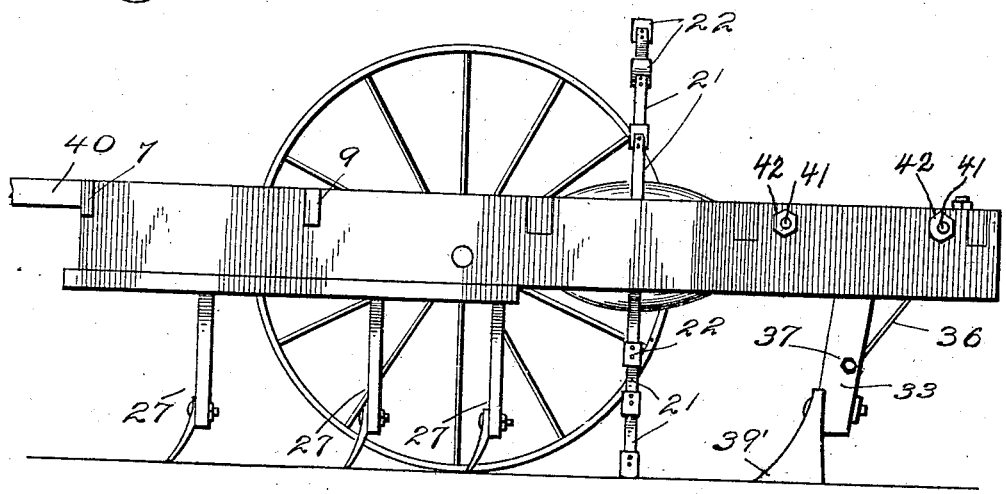
Figure 3:
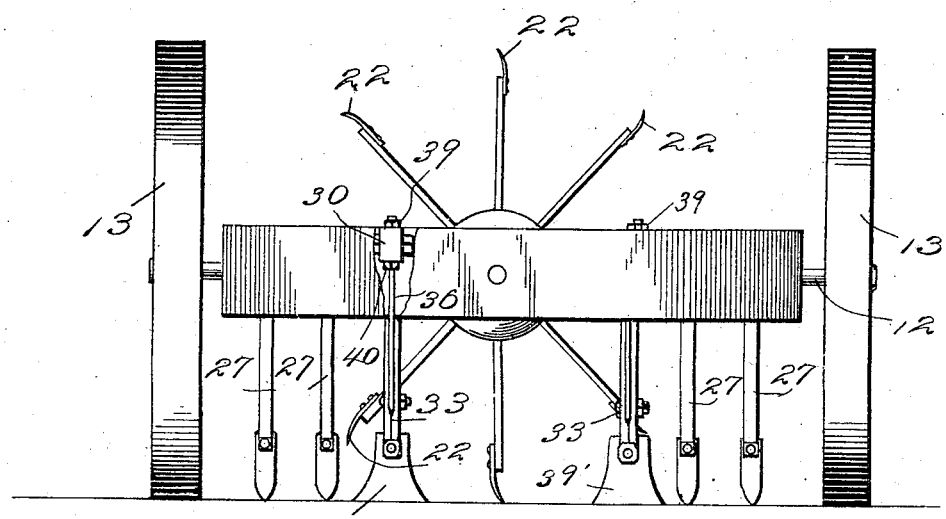
Figure 4:
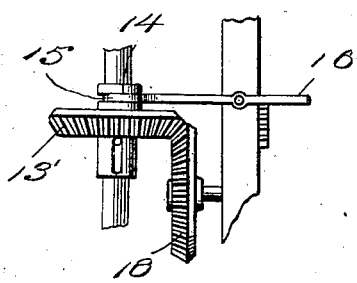

In the drawings forming a portion of this specification, and in which like numerals of reference indicate similar parts in the several views, Figure 1 is a top plan view showing a chopper embodying the present invention. Fig. 2 is a side elevation of the chopper. Fig. 3 is a rear elevation of the chopper, a portion of the frame being broken away. Fig. 4 is a detail view showing the means for throwing the chopping mechanism into and out of gear.

Referring now to the drawings, the chopper comprises a frame including the side sills 5 and 6, to which are connected the front and rear cross-pieces 7 and 8 and the intermediate cross-pieces 9, 10, and 11.

Journaled in suitable bearings in the sills 5 and 6 is a rotatable axle 12, to the ends of which are fixed the wheels 13, and on the axle 12 within the frame is splined a bevel gear-wheel 13', in the hub of which is a peripheral groove 14, having engaged therein the collar 15 at one end of a lever 16, which is pivoted upon the cross-piece 10. The lever at its rear end is provided with a handle to facilitate lateral shifting of the lever and corresponding movement of the bevel-gear 13 into and out of engagement with the second bevel-gear 18, carried by the chopper-shaft 19, which is journaled in the beams 10, 11, and 8. Upon the shaft 19, between the beams 10 and 11, is fixed a hub 20, from which radiate the arms 21, having at their extremities the chopping blades or hoes 22, upon which are secured the chopping knives or hoes in proper positions to insure efficiency in the operation. The beam 9 does not extend downwardly to the full depths of the sides 5 and 6, and beneath the beam 9 and secured at their rear ends in the angles between the sills or sides and the beam 10 are forwardly-converging harrow-beams 25 and 26, in which are engaged the standards 27 of the cultivator-shelves, which serve to treat the earth at both sides of the row of cotton. The beam 9 is let into the upper faces of the beams 25 and 26, and the latter have openings 28 therein through which the axle 12 is passed.

Let into the upper faces of the beams 11 and 8 are plow-beams 29 and 30, to which are secured plow-stocks 31 and 32, each of which consists of a plate bent upon itself with its bight portion 33 disposed downwardly and its extremities receiving the plow-beam between them, said extremities being connected by bolts 35, which serve to clamp the stock to the beam. A brace 36 is pivoted at its lower end between the sides of each stock upon a pivot-bolt 37, passed through the stock, the upper end of the brace being slidably engaged through the corresponding plow-beam and having nuts 39 and 40 disposed, respectively, above and below the plow-beam and which serve to adjust the brace through the beam to adjust the plow-point to various angles to the earth. The plow-points are shown at 39' and are bolted to the stocks in the usual manner. The plow-holding beams 29 and 30 are additionally secured by means of rods 41 passing transversely through said beams in front and in rear of the stocks or standards 31 and 32 and extending through the sills or side members 5 and 6 of the frame, said rods being secured by means of nuts 42, which are disposed adjacent to the plow-beams and also adjacent to the sills of the frame. In this manner an extremely rigid and effective structure is provided which is well able to resist any strain to which it may be subjected and which firmly supports the chopper-carrying shaft. A tongue 40 is let into the upper faces of the beams 7 and 9 and may be provided with the usual draft appliances for hitching draft-animals.

What is claimed is—

In a machine of the class described a frame structure including side members or sills and cross-pieces connecting the same and affording bearings for the chopper-shaft, plow-carrying beams gained into two of the cross-pieces in which the chopper-shaft is journaled, binding-rods extending transversely through the sills of the frame and through the plow-beams, and tightened nuts upon said rods adjacent to the sills and to the plow-carrying beams.

In testimony whereof we affix our signatures in presence of two witnesses.

WILAU E. MOUNCE.
SAMUEL L. SOUTHERN

Witnesses:
J. W. LUCKY,
W. P. LUCKY.